Sept. 15, 1970 E. G. NASSIMBENE 3,529,080

COLOR VIDEO RECORD AND PLAYBACK SYSTEM

Filed Nov. 14, 1967 2 Sheets-Sheet 1

INVENTOR.
ERNIE G. NASSIMBENE

BY Nathan N. Kallman

ATTORNEY

United States Patent Office 3,529,080
Patented Sept. 15, 1970

3,529,080
COLOR VIDEO RECORD AND PLAYBACK SYSTEM

Ernie G. Nassimbene, San Jose, Calif., assignor to International Business Machines Corporation, Armonk, N.Y., a corporation of New York
Filed Nov. 14, 1967, Ser. No. 682,844
Int. Cl. H04n 5/76, 9/02
U.S. Cl. 178—5.4 11 Claims

ABSTRACT OF THE DISCLOSURE

A color video recording and playback system employs a rotary head having two adjacent magnetic transducers for helical scanning of a magnetic tape that is advanced intermittently. An image pickup tube or camera having a single gun operates in conjunction with a color wheel for recording the color components of the image on separate track segments. During playback, the recorded color signal components are retrieved and interlaced for display.

CROSS REFERENCE TO RELATED APPLICATION

The apparatus disclosed in the present application employs an incremental tape advance technique, such as taught in copending U.S. patent application Ser. No. 653,782, filed July 17, 1967, now abandoned, assigned to the same assignee. U.S. patent application Ser. No. 697,846 was filed on Jan. 15, 1968 as a continuation-in-part of U.S. patent application Ser. No. 653,782. Briefly, the system disclosed therein employs a rotary head drum that scans a magnetic tape which is helically wrapped around a tape guide drum. The magnetic head assembly scans a first semicircular portion of the tape that is held by brakes in a fixed position. While the head is scanning the first tape portion, a second semicircular portion of the tape is incrementally advanced for a distance substantially equivalent to the distance between two tracks. As the head approaches the second portion of the tape, the second portion is fixed in position and scanned by the magnetic head, and the first portion is released to be advanced an increment, which is equivalent to the distance between two tracks. In this manner a series of oblique or helical tracks are registered on the magnetic tape, while the tape is advanced intermittently.

BACKGROUND OF THE INVENTION

Field of the invention

This invention relates to a color video recording and playback system.

Description of the prior art

Conventional color television recording systems generally require television camera equipment having three separate pickup elements to develop simultaneously the signals representative of the primary colors, namely, red, blue and green to form a composite signal. The composite color signal includes, inter alia, a chrominance signal, containing color difference signal information that relates to color saturation and hue, and a luminance or brightness signal. It is apparent that the use of a plurality of pickup camera elements introduces problems, such as coincident registry, additional circuitry, complexity and increased space and weight, resulting in undue cost of manufacture and maintenance.

Another well known approach to color image processing is the field sequential system which incorporates a monochrome type camera using a single pickup element in combination with a rotating color filter disk. In such systems, a relatively high field rate, such as 180 fields per second, for example, is generally employed to minimize color flicker and fringing effects. As a result, a television signal conversion apparatus must be utilized to convert the unconventional field rate to the accepted standard of 60 fields per second. In addition, the use of a color filter tends to reduce considerably the apparent brightness of the color image being viewed, thus degrading the color signal being developed. It would be desirable to provide a color recording system in which the above problems are overcome in a simple and inexpensive manner.

SUMMARY OF THE INVENTION

An object of this invention is to provide a novel and improved color television magnetic recording system that allows the use of a single pickup camera element.

Another object of this invention is to provide a color television magnetic recording and playback system wherein the problems of color flicker and fringing are minimized.

Another object is to provide a magnetic recording and playback system wherein only two rotary transducers are needed for registering and detecting a composite color signal.

According to this invention, a magnetic recording and playback system comprises a single element camera and a sectored rotary color filter wheel which serve to scan a color image to develop a field sequential signal containing the primary color components. The separate color signal components are magnetically recorded by a helical drive tape transport, wherein the magnetic tape is driven incrementally. The tape is traversed by a rotary head disk assembly carrying two transducers, which are positioned side by side on the periphery of the magnetic head disk. For each revolution of the color wheel during which the rotary head completes two revolutions, two parallel tracks are registered successively by means of the two transducers. The two tracks, which include two complete frames of information, consist of four segments that correspond respectively to the red, blue, green and monochrome content of the color image being recorded.

During the playback mode, the paired tracks, which contain the complete color image information, are sensed simultaneously by the two transducers, and the two tracks are scanned twice before the tape is advanced, in order to synchronize playback with the record mode. By including the monochrome signal with the primary color signal components, the flicker problem is reduced and picture brightness is enhanced.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings.

Similar numerals refer to similar elements throughout the drawings.

DESCRIPTION OF PREFERRED EMBODIMENT

Figures 1, 2:
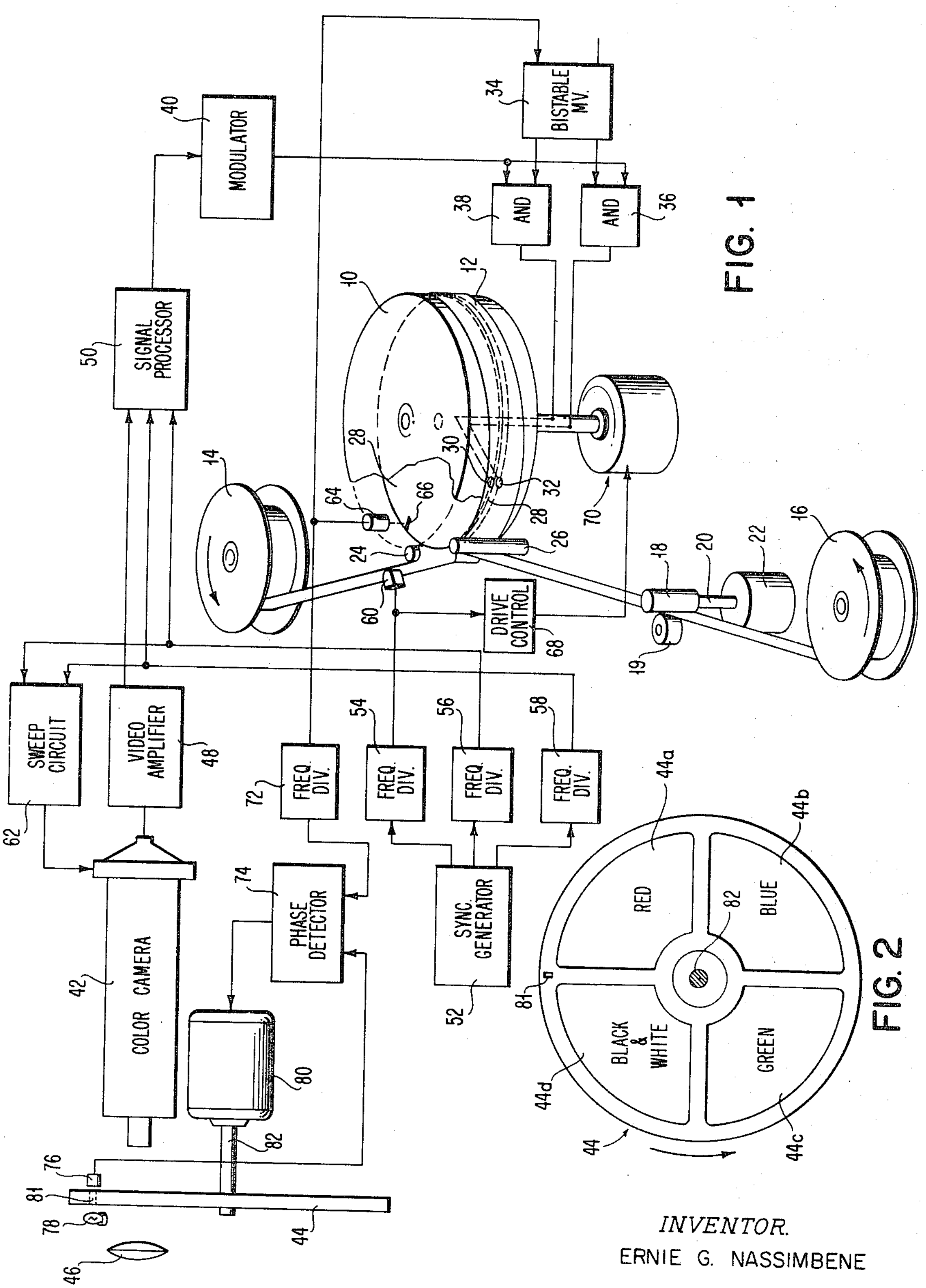
FIG. 1 is a schematic and block diagram of an embodiment of a color video recording system, according to this invention.
FIG. 2 is a plan view of a color filter wheel, used in the apparatus of FIG. 1.

With reference to FIG. 1, a magnetic tape apparatus for recording and playback of color video signals comprises a tape transport embodying a fixed guide drum 10, about which a magnetic tape 12 is wound and advanced incrementally in a helical path between a supply reel 14 and takeup reel 16. The tape 12 is driven by a capstan 18, that engages a pinch roller 19, the capstan being coupled by a shaft 20 to a stepping motor 22, which energizes the capstan for intermittent drive of the tape 12 as disclosed in detail in the aforementioned copending patent application Ser. No. 653,782. The stepping motor 22 is energized intermittently by a sequence or programmer (not shown) to advance the tape 12 by increments at a rate of 15 steps per second, by way of example. The tape 12 is guided by rollers 24 and 26 and is maintained under substantially constant tension during both the record and playback modes.

The tape 12 is scanned by a rotary head disk assembly 28 disposed within a central slot in the tape guide drum 10. The head assembly 28 supports two magnetic transducers 30 and 32 that are fixed to the periphery of the head disk, in side-by-side relationship along the same radius of the head disk. The rotating transducers 30 and 32 are activated alternately by means of a logic circuit comprising a bistable multivibrator or flip-flop 34 and AND gates 36 and 38 coupled to the output of the flip-flop 34. The transducers 30 and 32 serve to record successive tracks 39 (see FIG. 3) containing a composite frequency modulated color signal received from a modulator 40 onto the tape 12.

Figures 3, 4:
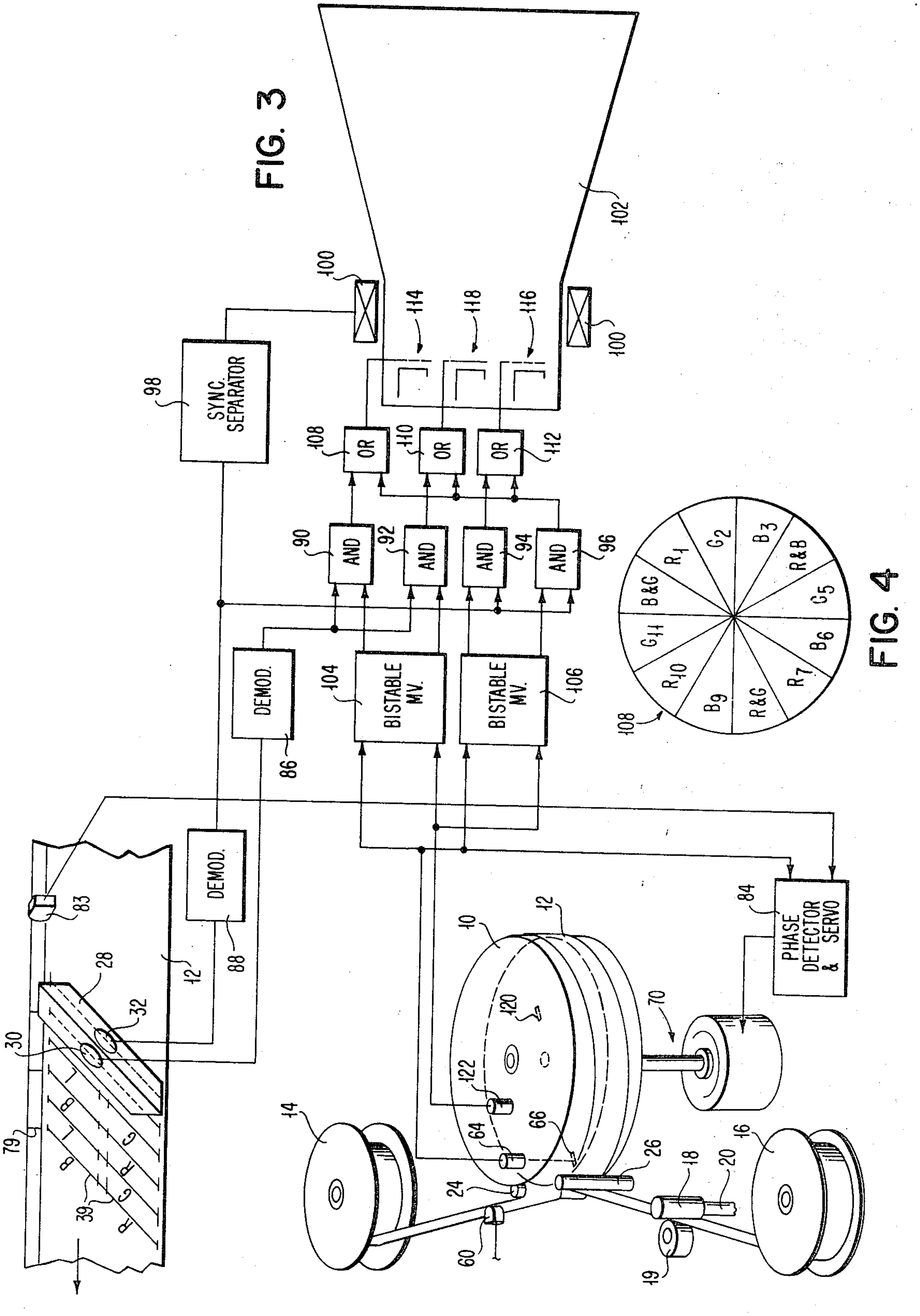
FIG. 3 is a schematic and block diagram of an embodiment of a color video playback system, such as employed with the instant invention.
FIG. 4 is a plan view of an alternative color filter wheel, applicable for use in the recording system of FIG. 1.

As indicated in FIG. 3, the tracks 39 of information recorded on the tape 12 are oblique to the longitudinal axis of the tape, and the recorded tracks are substantially parallel to each other. Each track 39 is formed of two portions or segments, each segment representing a field of color information occupying $\frac{1}{60}$ second, and each track 39 representing a frame of information occupying $\frac{1}{30}$ second. However, in the preferred embodiment of this invention, two frames of two recorded parallel tracks, which together relate to a $\frac{1}{15}$ second interval, contain the three primary television colors, red, blue, and green, and additionally a monochrome component, these four color components forming an entire color image.

To obtain the four color signal components that form the composite signal to be recorded, a camera 42 of the field sequential type, which may comprise a vidicon tube employing a single pickup element, scans the color image through a rotating color filter wheel 44. The color wheel 44 has four sectors or quadrants 44*a, b, c, d* (see FIG. 2) respectively passing red, blue, green and monochrome portions of the image signal. A lens 46 directs the color image through a portion of the color wheel so that during a $\frac{1}{60}$ second scan by the camera 42, one color image component, i.e., red, blue, green or monochrome, impinges on the camera target electrode for conversion to an electrical signal. The electrical signal output, composed of a sequence of color components, is fed from the camera 42 to a video amplifier 48, and the amplified signal is channeled to a signal processor 50.

At the same time, a synchronous generator 52 provides a base frequency signal, in this example, 31,500 hertz (Hz.) to a series of frequency dividers 54, 56 and 58. The output of the frequency divider 54 is a 30 Hz. signal that is applied to a record head 60 for registering marker pulses 79 at the edge of the tape 12. These marker pulses 79 are used as a reference during playback for synchronization of the tracks 39 on the tape 12 with the head assembly 28. The 30 cycles per second signal is also applied to a drive control circuit 68 in the drive assembly 70 of the rotary head assembly 28 to control the rotary speed of the head drum 28. The frequency dividers 56 and 58 respectively supply a horizontal synchronizing signal of 15,750 Hz., and a vertical synchronizing signal of 60 Hz. to the processor 50, which signals are added to the color information signal received from the camera 42. The composite color video signal is then directed to the modulator 40 for frequency modulation prior to recording onto the tape 12.

The horizontal and vertical synchronizing signals are also applied to a sweep circuit 62 coupled to the camera 42, so that the camera scanning electron beam is synchronized with the signals recorded on the tape 12 that denote the horizontal line and vertical deflection periods. During playback, the horizontal and vertical synchronizing signals are utilized to determine the deflection times in the television receiver tube for the horizontal lines and vertical fields.

Also, during recording, the angular velocity and phase of the radially aligned rotary transducers 30 and 32 are sensed by a photosensor, such as a photoelectric cell 64, that generates a signal in response to a reflecting marker 66 which is disposed on the surface of the rotary head disk 28. The marker 66 lies along the same radius as the transducers 30 and 32. The signal produced by the photoelectric cell 64 is utilized to switch the state of the flip-flop 34. When in the Set state, the flip-flop enables the AND gate 36; whereas if the flip-flop 34 is in the Reset condition, the AND gate 38 is enabled. In this way, the transducers 30 and 32 are alternately energized, for each revolution of the head disk assembly 28, to record the color information signal components received from the frequency modulator 40 through the AND gates 36 and 38, respectively. The transducer 30 records the red and blue signal information successively in segments along one track defining a frame, and then the transducer 32 records the green and monochrome color components as a second frame, after the tape 12 has been advanced for a predetermined increment. This cycle is repeated under synchronous control of the photosensor 64 associated with the rotary head disk 28.

The signal derived from the photoelectric cell 64 is also used to control the phase of the color wheel 44. To this end, the photoelectric cell output, a 30 Hz. signal, is passed to a frequency divider 72 that provides a 15 Hz. frequency signal to a phase detector 74. Simultaneously, the phase of the color wheel 44 is sensed by a photocell 76, in a well known manner, to produce a pulse each time that radiation from a light source 78 is radiated through an aperture 81 in the wheel 44, and impinges on the sensing head 76. The pulse obtained from the color wheel 44 is fed from the photocell 76 to the phase detector 74, and is compared to the frequency converted pulse from the photoelectric cell 64. The error signal is utilized to servo a drive motor 80 that is coupled to the color wheel 44 by a drive shaft 82, whereby the beginning of each cycle of revolution of the wheel 44 is coincident with that of the head disk assembly 28.

In a particular embodiment of this invention, the tape 12 is incremented at a rate of 15 steps per second, each increment being substantially equal in distance to the spacing between the two transducers 30 and 32, which may be 0.2 inch by way of example. The stepping mechanism for the tape drive system may be under the control of a programmer or sequencer (not shown), which in turn is controlled by the synchronous generator 52, that provides timing signals to the tape recording apparatus.

During playback, the tape 12 is advanced intermittently, but at the same rate of 15 steps per second as during the record mode. However, in the playback mode, both transducers 30 and 32 are energized simultaneously to read the recorded red and green signal components of a pair of recorded tracks, after which the blue and monochrome components of the same track pair are read together. To achieve the readout, the transducers 30 and 32 scan pairs of tracks 39 of the recorded signal, which include the four color signal components, twice in order to synchronize the reproduce process with the record mode. Thus, the first simultaneous scan of the red and green segments takes $\frac{1}{60}$ second, and the succeeding scan of the blue and monochrome components takes an additional $\frac{1}{60}$ second, the two scans being equivalent to one frame time of $\frac{1}{30}$ second. The second scan of the same track pair also occupies a frame time, so that two frame times of color information are obtained in $\frac{1}{15}$ second for the same color image that was recorded during a similar period of two frame times.

During readout, the tape 12 is incremented by the stepping motor 22 under command of the sequencer. When the magnetic head 76 senses a marker pulse 79, the tape motion is stopped in a position so that two complete tracks 39 containing two frames of the color image information are disposed around most of the tape guide drum 10 between the guide rollers 24 and 26. To insure that the transducers 30 and 32 are in proper phase with relation to the tracks 39 that are to be scanned, the photoelectric cell 64 senses the reflecting marker 66 when it is in "Home" position, i.e., when the marker 66 is in alignment with the photoelectric cell 64. At such instant, the photosensor 64 provides a pulse to a phase detector 84 that is coupled to the drive systems of the rotary head drum 28. At the same time, a signal is derived from the magnetic head 83, which senses a marker pulse 79, to indicate that a pair of tracks 39 are in proper alignment for readout. If the rotary head marker 66 is not in "Home" position, the drive system for the rotary head drum 28 is servoed in response to an error signal developed by the phase detector 84. In this manner, the rotary head drum 28 is synchronized with the tape drive, so that the pair of magnetic transducers 30 and 32 read along the parallel oblique tracks recorded on the tape 12.

As the transducers 30 and 32 scan the recorded tracks, the recovered signal components, red and green, and then blue and monochrome, are applied to demodulators 86 and 88. During the first field time, the demodulator circuit 86 provides an amplified output of red signal information to AND gates 90 and 92; while the demodulator circuit 88 supplies green signal information to AND gates 94 and 96. The output of demodulator circuit 88 is also directed to a separator circuit 98, which retrieves the vertical and horizontal synchronizing signals for application to the deflection circuit, represented by the deflection coil 100 of the receiver tube 102.

During the first vertical field time, the pulse produced by sensing the marker 66 on the rotary head disk 28 is taken from the photoelectric cell 64 to set bistable multivibrators or flip-flops 104 and 106. During the first portion of the play-back cycle, and AND gates 90 and 94 are enabled by the red and green components from the demodulators 86 and 88, respectively, and the red and green signal components are passed to conventional OR gates 108 and 112. These signal components respectively modulate the grids of beam-generating electron guns 114 and 116 for selectively activating the red color and the green color producing phosphor elements on the face of the display tube 102.

At the time that the transducers 30 and 32 complete the first field scan, and begin the scan of the second field, which includes the blue and luminance components, the rotary head disk 28 is displaced 180° from "Home" position. A second reflecting marker 120, on the surface of the rotary head disk and diametrically spaced from the marker 66, is sensed at this instant by a photoelectric cell 122, which is disposed adjacent to the photoelectric cell 64 and on the same radius along the tape guide drum 10. The resultant pulse signal switches the flip-flops 104 and 106, so that AND gates 92 and 96 are Set, and AND gates 90 and 94 are Reset.

When the blue signal component is applied to the AND gate 92, OR gate 110 passes a modulating signal to the color gun 118 that activates the blue producing phosphor elements. The monochrome signal, on the other hand, opens AND gate 96, which passes a signal through all the OR gates 108, 110, and 112 and activates the red, blue and green color producing electron guns simultaneously to provide the monochrome portion of the color picture. During each field time, one color component, red, blue, green or the luminance component is completely displayed or represented on the raster of the television tube. Alternate fields are interlaced, in the same manner as utilized in conventional television practice. In this way, the original color image that was scanned and recorded on the magnetic tape is faithfully reproduced for display.

In another approach, the color wheel may comprise a multiplicity of color sectors, twelve for example, as depicted in FIG. 4. The color wheel 108 rotates so that each sector passes in front of the field sequential camera 42 for $\frac{1}{60}$ second, i.e., a complete revolution of the filter wheel 108 takes $\frac{1}{5}$ second. Every fourth sector of the wheel 108 contains a filter that passes a combination of colors, e.g., blue and green, red and blue, red and green, in lieu of the monochrome component. With such arrangement, the primary colors are repeated at a rate of 50 times per second. Thus, in a one second interval, 30 images of pure colors interlaced with 20 images of combination colors are processed. At this rate of signal processing, flicker is further reduced.

There has been described herein a color image recording and playback apparatus wherein the color signal components are recorded on separate portions of helical tracks on a magnetic tape that is driven intermittently. Each signal portion represents a field of color information and, during playback, the color fields are interlaced to compose a complete color image. By virtue of the novel arrangement disclosed herein, the color camera means may be simple and inexpensive, and color flicker is minimized, among other things.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. Apparatus for recording color images comprising:
means for scanning a color image and for obtaining separate color signal components, including a monochrome signal component, of such image;
a record medium;
means for advancing said record medium incrementally; and
means for recording such separate signal components serially on parallel tracks disposed obliquely on said record medium with two such parallel tracks corresponding to two frames of color television information containing three primary color signal components and the monochrome signal component, said components constituting the complete color information for said color image.

2. Apparatus as in claim 1, wherein the primary color signal components are blue, red and green components respectively, said monochrome signal being a fourth signal component.

3. Apparatus as in claim 1, including means for reproducing the first and third of such recorded color signal components simultaneously; and for reproducing the second and fourth signal components simultaneously.

4. Apparatus as in claim 3, including means for displaying the first and third color signal components for one television field time, and the second and monochrome signal components for a second television field time, the displayed fields being interlaced.

5. Apparatus as in claim 3, wherein said reproducing means comprises a rotary head disk for scanning the record medium, and a pair of magnetic transducers mounted side-by-side on the periphery of such head disk along the same radius of the disk.

6. Apparatus as in claim 5, wherein the signal components are frequency modulated in seriatim, and the serial progression of modulated signal components are applied alternately to said rotary transducers for recording on a magnetic tape.

7. Apparatus as in claim 1, wherein the scanning means includes a color wheel having a number of color filter sectors corresponding to the number of color signal components including the monochrome signal component.

8. Apparatus as in claim 1, wherein the scanning means includes a color wheel having a number of color filter sectors that is a multiple of the total number of color signal components being processed.

9. Apparatus as in claim 8, wherein said color wheel includes color filter sectors that pass more than one primary color.

10. A method of recording first, second and third video color signal components and a monochrome signal component, all constituting at least one television frame of an image comprising the steps of:

sequentially recording said first and said second color signal components on a first recording track, and sequentially recording said third and said black and white signal components on a second track parallel to said first track.

11. A method of reproducing color image information serially recorded on paired parallel tracks of a magnetic medium, such tracks having a plurality of color signal components and a monochrome signal component recorded serially, comprising the steps of:

simultaneously scanning such paired tracks for recovering pairs of such color signal components; and interleaving the recovered signal components for display of the recorded color image.

References Cited

UNITED STATES PATENTS

| | | | |
|---|---|---|---|
| 2,878,309 | 3/1954 | Christensen. | |
| 2,969,425 | 1/1961 | Hughes. | |
| 2,986,725 | 5/1961 | Dirks. | |
| 3,234,323 | 2/1966 | Kihara. | |
| 3,267,207 | 8/1966 | Okazaki et al. | |
| 3,359,365 | 12/1967 | Kihara | 178—5.4 |
| 3,395,385 | 7/1968 | Scoville. | |

RICHARD MURRAY, Examiner

U.S. Cl. X.R.

178—6.6